(12) United States Patent
Poisner

(10) Patent No.: US 8,775,803 B2
(45) Date of Patent: Jul. 8, 2014

(54) HIGH SECURITY DISPLAY OF PRIVATE DATA

(75) Inventor: David I. Poisner, Carmichael, CA (US)

(73) Assignee: Intel-GE Care Innovations LLC, Roseville, CA (US)

( * ) Notice: Subject to any disclaimer, the term of this patent is extended or adjusted under 35 U.S.C. 154(b) by 752 days.

(21) Appl. No.: 12/974,994

(22) Filed: Dec. 21, 2010

(65) Prior Publication Data

US 2012/0159160 A1    Jun. 21, 2012

(51) Int. Cl.
*H04L 9/00* (2006.01)
*G06F 21/60* (2013.01)
*G09C 5/00* (2006.01)
*G06F 21/62* (2013.01)
*H04L 29/06* (2006.01)

(52) U.S. Cl.
CPC .............. *G06F 21/606* (2013.01); *G09C 5/00* (2013.01); *G06F 21/6245* (2013.01); *H04L 63/0492* (2013.01)
USPC ............................................ 713/168; 726/33

(58) Field of Classification Search
CPC ..... G06F 21/606; G06F 21/6245; G09C 5/00; H04L 63/0492
USPC ............................ 713/153, 168, 176; 382/100
See application file for complete search history.

(56) References Cited

U.S. PATENT DOCUMENTS

2006/0155589 A1*   7/2006   Lane et al. .................... 705/4
2007/0266252 A1*   11/2007   Davis et al. ................. 713/176
2011/0264922 A1*   10/2011   Beaumont et al. .......... 713/189

* cited by examiner

*Primary Examiner* — Brandon Hoffman
*Assistant Examiner* — Nega Woldemariam
(74) *Attorney, Agent, or Firm* — Pillsbury Winthrop Shaw Pittman LLP

(57) ABSTRACT

A device, method, and computer-readable medium are disclosed. In one embodiment, the device includes an inbound port to receive information from an information retrieval peripheral. The device also includes an outbound port to send information to a local computing device. The device includes masking logic to cause the local computing device to recognize the portable security device as at least one of a plurality of endpoint devices. The device also includes data obfuscation logic that is capable of obfuscating simple data format data, received from the information retrieval peripheral, obfuscating that data into a non-simple data format, and sending the obfuscated data to the local computing device. The non-simple data format includes at least one frame of video.

17 Claims, 3 Drawing Sheets

HIGH SECURITY DISPLAY OF PRIVATE DATA

FIELD OF THE INVENTION

The invention relates to a providing a secure way of retrieving text-based data from a peripheral device coupled to a computer.

BACKGROUND OF THE INVENTION

The existing Intel® Corporation Personal Health System (PHS) is a dedicated appliance that provides a variety of functions, including acquisition and transmission of patient medical data. The data is also sent to a back-end service to allow analysis and monitoring by automated agents and clinicians. That data may include blood pressure, weight, pulse, etc. The functions associated with the data acquisition and transmission are regulated in some countries, typically by agencies such as the Food and Drug Administration (FDA) in the United States. The PHS performs a mixture of regulated and unregulated functions.

There is a desire to reduce the cost of the implementation by running PHS functions on a general-purpose personal computing device, including personal computer that might already be in the patient's home, while maintaining security levels of a dedicated system.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a device, method, and computer-readable medium to manage security of text-based information between a peripheral device and a computing device are disclosed.

Figure 1:
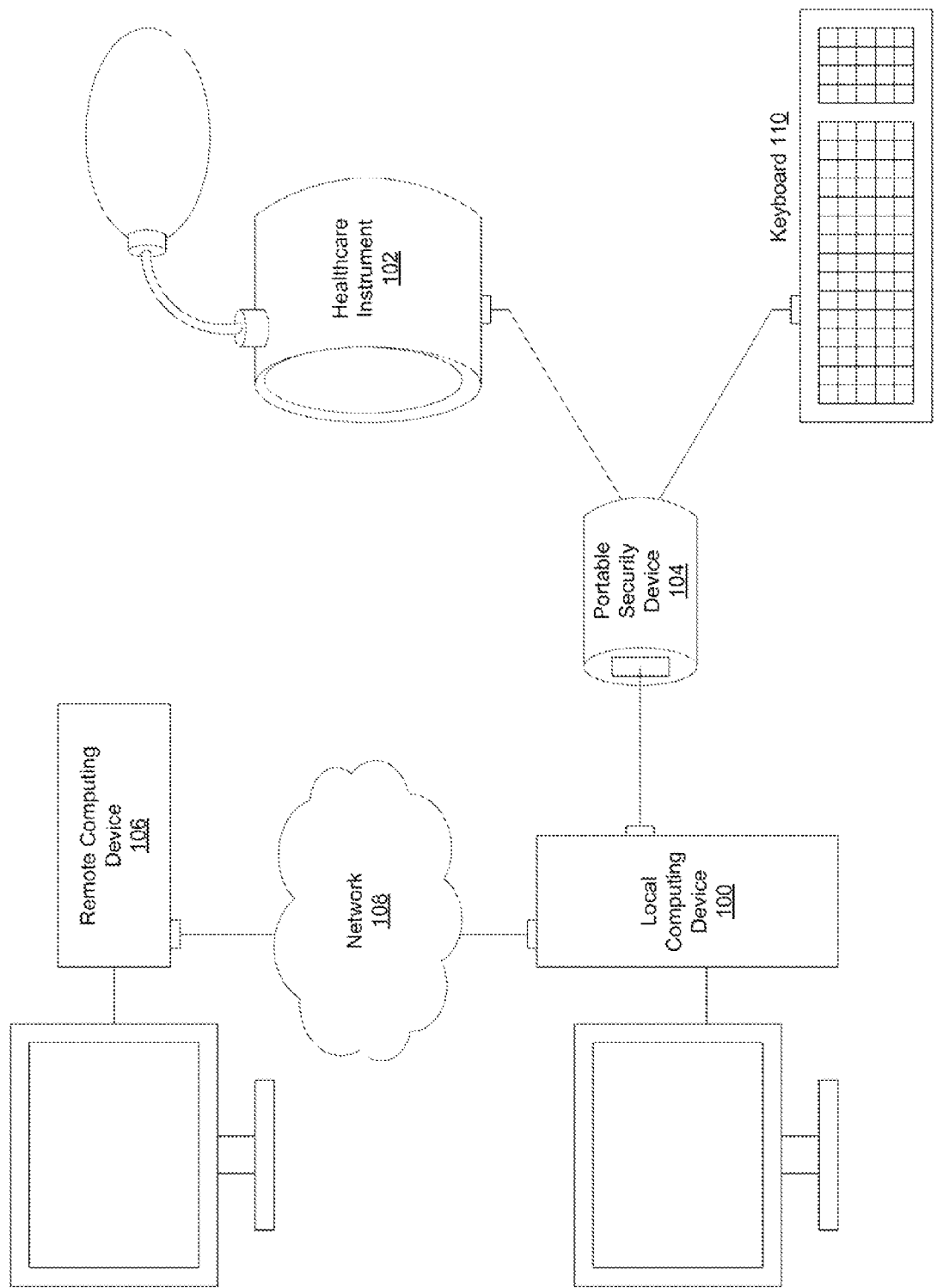
FIG. 1 illustrates a portable security device capable of providing data obfuscation to increase security for health information input into a computing device.

FIG. 1 illustrates a portable security device capable of providing data obfuscation to increase security for health information input into a computing device.

Many current healthcare instruments that measure a person's health create digital or analog data that is sent to a computer 100 for processing. For example, digital versions of blood pressure cuffs (e.g., 102 in FIG. 1), thermometers, scales, and pulse readers may take measurements and report out the results in one or more data packets that include text-based results. Other devices may report analog results that are then sent to a computer for analog-to-digital conversion and then processing. These results are in many cases full of an individual's private health information that require secure protection. Yet, healthcare instruments do not generally provide data security in the form of encryption, etc. Generally, a healthcare instrument may attach to a computer through a standard interface such as USB (Universal Serial Bus). Therefore, it would be beneficial to provide at least a layer of data security in this environment.

In many embodiments, a portable security device 104 is described. The portable security device may be in a small form factor, such as a dongle-type device. Dongle devices generally plug into an input/output port, such as USB and are not much wider than a cord attached to the plug. For example, one such dongle solution would have a dongle portable security device 104 plugged into a USB port of a local computing device 100 and then a healthcare instrument 102, which has a USB interface, is plugged into the dongle. Thus, the dongle portable security device 104 is "in-line" between the healthcare instrument and the computer.

The healthcare instrument may take a measurement of a patient's health and send the measurement in a simple data format within a packet through the USB interface. Examples of the simple data format may be binary format data, hexadecimal format data, ASCII text format data, etc. The simple data format includes data in the packet to either be in a readable text-based format or allows for the data to be directly translated into a text-based format using a standard translation technique. Additionally, the simple data format does not require additional keys, decrypters, decoding algorithms, etc. For example, translating binary information to ASCII text is a form of direct translation of a simple data format using well known binary-to-ASCII translation. On the other hand, the simple data format does not include an encrypted or encoded data format that requires additional data (such as a decryption key) or technology (such as a video decoder) to translate the received data to a text-based version. With the portable security device in place, the packet reaches the portable security device through the USB interface. The portable security device may receive the packet and proceed to obfuscate (i.e., disguise) the data in the packet.

Data obfuscation may take one of many forms. For example, in some embodiments, the portable security device may read in the text data from the packet, generate a video frame displaying the data, and then send a stream of video data comprising a running loop of the created video frame to the local computing device. Thus, in these embodiments, the local computer receives a video feed of the text data instead of the text data itself. A user at the local computer would then proceed to view a video representation of the data generated by the medical device. Video encoding, such as general digital video disc (DVD) encoding formats provide more security than standard text-based packets. DVD security features include a highly evolved security standard throughout the consumer electronic industry to provide a significant deterrent to the illegal copying of movies and other DVD content.

Additionally, in many embodiments, a primary target of the data from the healthcare instrument is a remote computing device 106, such as one in a doctor's office, which can communicate to the local computing device 100 over a network 108. In these embodiments, the local computing device 100 that is coupled through an I/O interface to the portable security device 104 may be utilized simply as a network router to route the packet through to the remote computing device 106 instead of saving the packet locally. In these embodiments, the portable security device 104 may receive the data packet from the healthcare instrument, encrypt the data using a form of encryption such as a hashed-based algorithm with a private key, and then send the encrypted data to the remote computing device 106 utilizing the local computing device 100 as a router. To secure the data packet while being routed through the local computing device 100, the local computing device may not be aware of the decryption key necessary to decrypt the data. Rather, in these embodiments, the remote computing device 106 would be the only computing device that had access to the decryption key to decrypt the data in the packet.

Another way in which important medical information enters the computing device is through a keyboard 110 plugged into the computing device. A user may type in their personal medical information to be saved in the local computing device or reported through to the remote computing device. In many embodiments, the portable security device may also include another I/O interface that allows a keyboard to be plugged into it. The portable security device may intercept keystrokes from the keyboard as they are input and sent through the I/O interface to the local computing device 100. After interception, the portable security device may encode the keystrokes into a video frame and send the frame to the local computing device to be viewed as video by a user of the local computing device 100.

Figure 2:
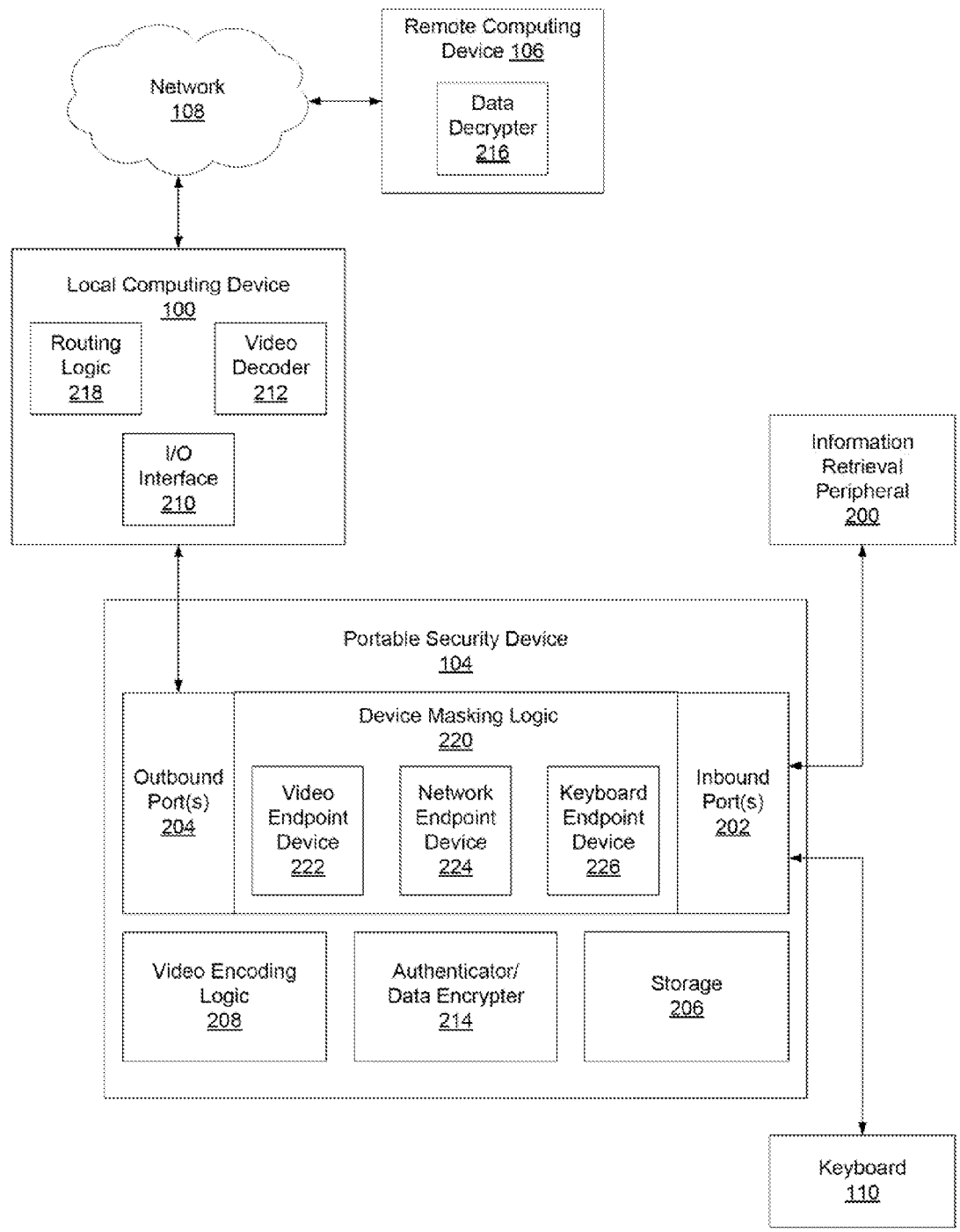
FIG. 2 illustrates a set of components within and related to a portable security device capable of providing data obfuscation to increase security for health information input into a computing device.

FIG. 2 illustrates a set of components within and related to a portable security device capable of providing data obfuscation to increase security for health information input into a computing device.

Although the embodiment in FIG. 1 elaborated specifically about a portable security device that provides protection for incoming medical data from a healthcare instrument, in other embodiments, another type of information retrieval peripheral 200 is present instead of a medical instrument. In FIG. 2, the portable security device 104 is attached along the I/O communication interface between the information retrieval peripheral 200 and the local computing device 100. At some point in time, the information retrieval peripheral 104 captures data and sends data in a simple data format (e.g., a packet of information including a simple data format payload) towards local computing device 100 along the I/O path. Prior to reaching local computing device 100, the portable security device 104 intercepts the packet at inbound port 202. Inbound port 202 may include a plug interface that replicates a similar plug interface at the local computing device 100, which information retrieval peripheral 200 would be plugged into if it were not for portable security device 104 being in an intermediary position between the peripheral and the computer.

In different embodiments, the information retrieval peripheral 200 and/or the keyboard 110 may be coupled to the portable security device through a USB link, a Bluetooth link, or another type of link designed to provide data throughput between two or more devices. Also, in embodiments that are not shown, there is more than one information retrieval peripheral attached to the portable security device.

In many embodiments, the portable security device 104 also is coupled through a plug interface to the local computing device 100. In other embodiments, the I/O interface is hardwired and does not include a plug interface. The portable security device 104 utilizes outbound port 204 to interface with the local computing device 100.

The portable security device 104 includes a storage space 206, in many embodiments. The storage space can include a buffer that allows for at least temporary storage of incoming data from the information retrieval peripheral (e.g., medical instrument) as well as from a keyboard 110. The received data may be operated upon while in temporary storage to create an obfuscated version of the data prior to the portable security device 104 sending it on to the local computing device 100.

Once the portable security device 104 has received the data and stored it into the storage 206, one or more obfuscation processes may be performed on the data. In some embodiments, video encoding logic 208 will take the data from storage 206 and encode it into a frame of video. The type of video encoded may be a digital video disc (DVD) format in many embodiments. In other embodiments, another format of video encoding is utilized. Though, for security purposes, a substantially secure form of video encoding would be beneficial.

The encoding may take the form of a single frame of video or multiple frames of video. Furthermore, the image that is recorded may be preset with a graphical background and the simple data format data present within the frame. For example, a premade image that includes a visual image of the text "Patient's blood pressure: _____" may be a portion of the video frame. This premade frame may be stored in storage 206. Then a patient's actual blood pressure reading is sent in a simple data format packet from information retrieval peripheral 200 to the portable security device 104. The simple data format blood pressure reading (e.g, 110/70) may simply be visually added to the premade frame and encoded into a video frame. That single frame may then be sent through outbound port 204 to the local computing device 100 or the frame may be looped to have a continuous stream of the created image with the image representation of the patient's blood pressure reading. The stream of the repeating video frame can be sent to the local computing device.

In many embodiments, local computing device 100 receives the one or more frames of video through I/O interface 210 and sends the frames to video decoder 212 for decoding.

In other embodiments, the portable security device 104 may utilize data authentication/encryption logic 214 to authenticate and encrypt the simple data format packet arriving from the information retrieval peripheral 200. The actual form of encryption can be any one of several types of encryption. For example, the portable security device 104 may include a private key to hash with the simple data format data in the packet. The portable security device 104 may then send the encrypted data to the remote computing device 106, using the local computing device 100 simply as a router. In these embodiments, the local computing device does not have a key to decrypt the data and uses routing logic 218 to pass the packet on through the network 108 to the remote computing device 106. The remote computing device 106 may then include a data decrypter 216 to decrypt the received encrypted data packet. The data decrypter 216 may have been given a secure key used to produce the data from the encrypted hash version received from the portable security device 104.

Device masking logic 220 is located in the portable security device 104. In many embodiments, device masking logic 220 causes at least one device coupled to the portable security device 104 to recognize the portable security device as a different device. For example, when the portable security device 104 sends encoded video data to the local computing device, device masking logic 220 includes video endpoint device logic 222 to cause the local computing device 100 to think it is attached through the I/O interface to a DVD player rather than to the portable security device. For example, if the data link coupling the portable security device to the local computing device is a USB link, the video endpoint device logic may provide DVD drive device information to the local computing device when the plug-and-play query is sent to the portable security device using the USB protocol.

Apart from spoofing a DVD player, the device masking logic 220 may also spoof one or more other devices to suit portable security device 104 needs. For example, network endpoint device logic 224 may cause the local computing device 100 to view the portable security device 104 as a remote computing device connected through a network. Another example of this spoofing concept includes a keyboard endpoint device 226, which may cause the local computing device 100 to view the portable security device 104 as the keyboard itself, rather than as a device coupled to the keyboard. Thus, not only is the portable security device 104 encoding/encrypting the data provided, but it also may cause the local computing device 100 to believe that it is not coupled to a medical peripheral or other secure data device.

Figure 3:
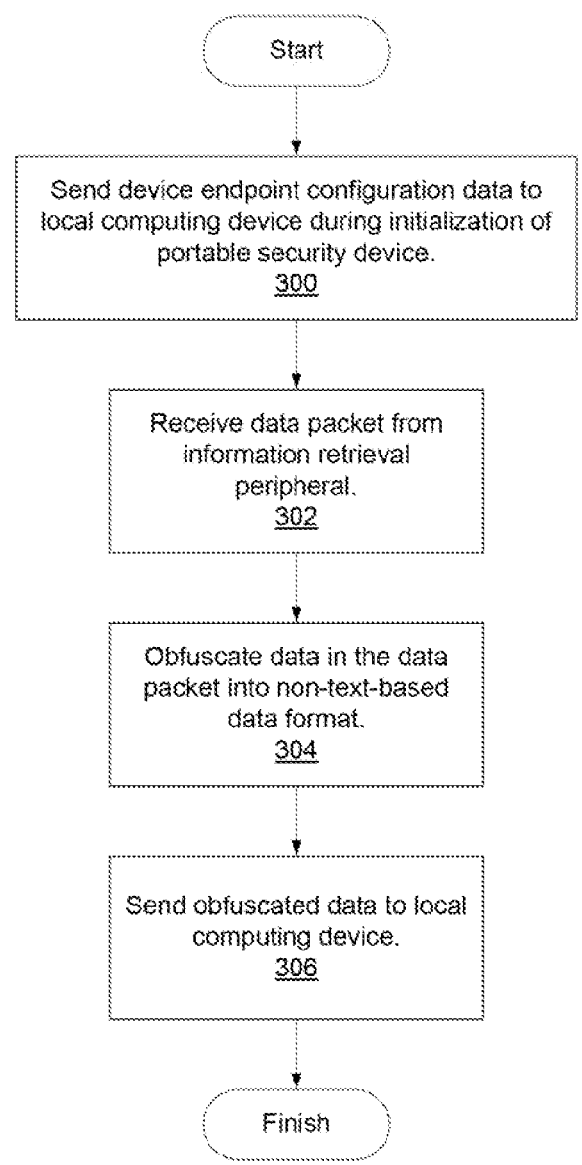
FIG. 3 is a flow diagram of an embodiment of a process to translate text-based data into a non-text-based data format for security purposes.

FIG. 3 is a flow diagram of an embodiment of a process to translate simple data format data into a non-simple data format for security purposes. The process is performed by processing logic that may comprise hardware circuitry, firmware code, software applications, or a combination of any of the above three types of processing logic.

The process begins by processing logic sending device endpoint configuration data to a local computing device during the initialization of the portable security device (processing block 300). The configuration information includes information provided to the local computing device when the local computing device recognizes that a device has been plugged into one of its I/O ports. This information notifies the local computing device of the type of device plugged into the I/O port, although, in the embodiments shown, the information is not technically accurate. Rather, the information spoofs another device to cause the local computer device to recognize one device, such as a DVD player, when actually the portable security device is plugged in instead.

Next, processing logic receives a data packet from the information retrieval peripheral (processing block 302). The information retrieval peripheral may be a medical instrument, a keyboard, or another type of device altogether.

Then processing logic obfuscates the data received (processing block 304). In the embodiment described in the process in FIG. 3, the obfuscation takes text-based data and creates non-simple data format (e.g., an image of text). Although, in other embodiments, the data is encrypted.

Finally, processing logic sends the obfuscated data on to the local computing device (processing block 306) and the process is finished.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions.

In the description above and in the claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate, interact, or communicate with each other.

In the description above, certain terminology is used to describe embodiments of the invention. For example, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a microcontroller, or the like.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The invention claimed is:

1. A portable security device, comprising:
   at least one inbound port to communicatively couple the portable security device to at least one information retrieval peripheral;
   at least one outbound port to communicatively couple the portable security device to a local computing device;
   device masking logic to cause the local computing device to recognize the portable security device as an endpoint device that is different from the portable security device; and
   data obfuscation logic to:
     retrieve a first amount of simple data format data from the at least one information retrieval peripheral;
     obfuscating the first amount of simple data format data into a non-simple data format, wherein the non-simple data format includes at least one frame of video; and
     send the obfuscated non-simple data format data to the local computing device.

2. The portable security device of claim 1, further comprising:
   wherein the at least one information retrieval peripheral includes a medical device to retrieve vital sign information from a patient.

3. The portable security device of claim 1, wherein the device masking logic is operable to cause the local computing device to recognize the portable security device as a video player endpoint device.

4. The portable security device of claim 3, wherein the at least one information retrieval peripheral comprises a keyboard; and the data securing logic is further operable to:
   intercept one or more keystrokes of simple data format data sent from the keyboard;
   encode the keystrokes of simple data format data into the at least one frame of video; and send the at least one frame of video to the local computing device in lieu of sending the keystrokes of simple data format data.

5. The portable security device of claim 1, wherein the at least one frame of video is encoded using a content-protected digital video disc (DVD) format.

6. The portable security device of claim 1, wherein the data securing logic is further operable to:
cause the local computing device to recognize the portable security device as a network endpoint device;
retrieve a second amount of simple data format data from the at least one information retrieval peripheral;
encrypt and authenticate the second amount of simple data format data; and
send the encrypted and authenticated second amount of simple data format data to a remote computing device, wherein the local computing device is capable of routing information from the portable security device to the remote computing device.

7. A method, comprising:
causing a local computing device to recognize a portable security device as an endpoint device that is different from the portable security device, wherein the portable security device is communicatively coupled to the local computing device through a first port;
retrieving a first amount of simple data format data from an information retrieval peripheral, wherein the information retrieval peripheral is communicatively coupled to the portable security device through a second port;
obfuscating the first amount of simple data format data into a non-simple data format, wherein the non-simple data format includes at least one frame of video; and
sending the obfuscated non-simple data format data to the local computing device.

8. The method of claim 7, wherein the information retrieval peripheral comprises a medical device to retrieve vital sign information from a patient.

9. The method of claim 7, further comprising:
causing the local computing device to recognize the portable security device as a video player endpoint device.

10. The method of claim 9, wherein the at least one information retrieval peripheral comprises a keyboard, the method further comprises:
intercepting one or more keystrokes of simple data format data sent from the keyboard;
encoding the keystrokes of simple data format data into the at least one frame of video; and
sending the at least one frame of video to the local computing device in lieu of sending the keystrokes of simple data format data.

11. The method of claim 7, wherein the at least one frame of video is encoded using a content-protected digital video disc (DVD) format.

12. The method of claim 7, further comprising:
causing the local computing device to recognize the portable security device as a network endpoint device;
retrieving a second amount of simple data format data from the at least one information retrieval peripheral;
encrypting and authenticating the second amount of simple data format data; and
sending the encrypted and authenticated second amount of simple data format data to a remote computing device, wherein the local computing device is capable of routing information from the portable security device to the remote computing device.

13. A non-transitory computer readable medium having stored thereon instructions, which if executed by a computer causes the computer to perform a method comprising, comprising:
causing a local computing device to recognize a portable security device as an endpoint device that is different from the portable security device, wherein the portable security device is communicatively coupled to the local computing device through a first port;
retrieving a first amount of simple data format data from an information retrieval peripheral, wherein the information retrieval peripheral is communicatively coupled to the portable security device through a second port;
obfuscating the first amount of simple data format data into a non-simple data format, wherein the non-simple data format includes at least one frame of video; and
sending the obfuscated non-simple data format data to the local computing device.

14. The computer readable medium of claim 13, wherein the information retrieval peripheral comprises a medical device to retrieve vital sign information from a patient.

15. The computer readable medium of claim 13, wherein the performed method further comprises:
causing the local computing device to recognize the portable security device as a video player endpoint device.

16. The computer readable medium of claim 15, wherein the at least one information retrieval peripheral comprises a keyboard, the performed method further comprising:
intercepting one or more keystrokes of simple data format data sent from the keyboard;
encoding the keystrokes of simple data format data into the at least one frame of video; and
sending the at least one frame of video to the local computing device in lieu of sending the keystrokes of simple data format data.

17. The computer readable medium of claim 13, wherein the performed method further comprises:
causing the local computing device to recognize the portable security device as a network endpoint device;
retrieving a second amount of simple data format data from the at least one information retrieval peripheral;
encrypting and authenticating the second amount of simple data format data; and
sending the encrypted and authenticated second amount of simple data format data to a remote computing device, wherein the local computing device is capable of routing information from the portable security device to the remote computing device.

* * * * *